US009684298B2

(12) United States Patent
Frascati et al.

(10) Patent No.: US 9,684,298 B2
(45) Date of Patent: Jun. 20, 2017

(54) NUMERIC CONTROL MACHINE TOOL
(71) Applicant: PARPAS S.P.A., Cadoneghe (IT)
(72) Inventors: Carlo Frascati, Padua (IT); Vladi Parpajola, Cadoneghe (IT)
(73) Assignee: PARPAS S.P.A., Cadoneghe (IT)
( * ) Notice: Subject to any disclaimer, the term of this patent is extended or adjusted under 35 U.S.C. 154(b) by 487 days.
(21) Appl. No.: 14/386,594
(22) PCT Filed: Mar. 25, 2013
(86) PCT No.: PCT/IB2013/052364
§ 371 (c)(1),
(2) Date: Sep. 19, 2014
(87) PCT Pub. No.: WO2013/140383
PCT Pub. Date: Sep. 26, 2013
(65) Prior Publication Data
US 2015/0081078 A1 Mar. 19, 2015
(30) Foreign Application Priority Data
Mar. 23, 2012 (IT) .............................. TV2012A0045
(51) Int. Cl.
*B23Q 11/00* (2006.01)
*G05B 19/19* (2006.01)
(Continued)
(52) U.S. Cl.
CPC ............ *G05B 19/195* (2013.01); *B23C 1/002* (2013.01); *B23Q 1/012* (2013.01);
(Continued)
(58) Field of Classification Search
None
See application file for complete search history.

(56) References Cited
U.S. PATENT DOCUMENTS
3,580,133 A * 5/1971 Berthiez .............. B23Q 11/001
408/235
4,844,643 A * 7/1989 Icks ........................ B23C 5/202
407/114
(Continued)

FOREIGN PATENT DOCUMENTS
EP 2412475 A1 2/2012

OTHER PUBLICATIONS
International Search Report for PCT/IB2013/052364.

*Primary Examiner* — Isaac T Tecklu
(74) *Attorney, Agent, or Firm* — Gottlieb, Rackman & Reisman, P.C.

(57) ABSTRACT

A numeric control machine tool of the type comprising: a basement; a substantially rectilinear main supporting crossmember which extends above the basement and has two axial ends structured so as to rest stably and in an axially sliding manner on two reciprocally parallel rectilinear guides present on the basement; a movable slide which is fixed protruding onto a side of the main supporting crossmember, with the possibility of moving along the body of the main supporting crossmember; a substantially rectilinear vertical movable tower, which is fixed on the movable slide in a substantially vertical position and with the possibility of translating with respect to the movable slide in a vertical direction; and a tool-hold head which is fixed on the lower end of said vertical movable tower; the main supporting crossmember being structured so as stably to support the weight of the movable slide, the vertical movable tower and the tool-holder head, and the numeric control machine tool also comprising a substantially rectilinear auxiliary supporting crossmember, which extends beside the main supporting crossmember so as to be locally facing and distanced from the side of the crossmember which supports the movable slide; and on which the movable slide rests by means of interposition of a reaction member which is structured so as to vary its height, simultaneously exercising an upward thrust on the projecting arm.

17 Claims, 3 Drawing Sheets

(51) Int. Cl.
*B23C 1/00* (2006.01)
*B23Q 1/01* (2006.01)

(52) U.S. Cl.
CPC .................. *B23Q 11/0014* (2013.01); *G05B 2219/49001* (2013.01); *G05B 2219/50264* (2013.01)

(56) References Cited

U.S. PATENT DOCUMENTS

| | | | | |
|---|---|---|---|---|
| 5,375,952 A * | 12/1994 | Line | ........................ | B23Q 1/012 408/234 |
| 5,839,323 A * | 11/1998 | Line | ........................ | B23Q 1/012 408/37 |
| 6,068,431 A * | 5/2000 | Line | ........................ | B23Q 1/012 144/2.1 |
| 6,089,164 A * | 7/2000 | Ostick | ........................ | B66C 9/10 105/163.1 |
| 6,220,799 B1 * | 4/2001 | Okutani | .................... | B23Q 1/012 29/26 A |
| 2002/0079292 A1 * | 6/2002 | Wehrli | ...................... | B23H 7/02 219/69.11 |
| 2005/0245178 A1 * | 11/2005 | Takashima | ............ | B21C 37/207 451/59 |
| 2006/0291971 A1 * | 12/2006 | Tanoue | .................... | B23Q 1/012 409/202 |
| 2008/0003073 A1 * | 1/2008 | Ferrari | .................... | B23Q 1/012 409/202 |
| 2011/0164939 A1 * | 7/2011 | Sakai | ...................... | B23Q 1/017 409/212 |
| 2013/0045055 A1 * | 2/2013 | Derycke | ................. | E21D 9/104 405/138 |

* cited by examiner

NUMERIC CONTROL MACHINE TOOL

TECHNICAL FIELD

The present invention relates to a numeric control machine tool.

In greater detail, the present invention relates to a numeric control milling machine of the movable portal type, to which the explanation below shall specifically refer without thus losing its general nature.

BACKGROUND ART

As known, numeric control milling machines or boring machines, traditionally called "gantry" type, essentially comprise a long horizontal main supporting crossmember with a highly rigid structure, which extends horizontally and perpendicularly to the longitudinal axis of the machine, at a predetermined height from the ground, and has two axial ends structured so as to rest stably and in an axially sliding manner on two horizontal rectilinear guides which extend parallel to the longitudinal axis of the machine, on the top of two side walls or buttresses raised from the basement; a movable slide which is fixed protrudingly and in an axially sliding manner on a series of rectilinear guides which extend along the side of the main supporting crossmember parallel to the longitudinal axis of said crossmember, so as to move along the crossmember in a horizontal direction locally parallel to the longitudinal axis of the crossmember; a movable vertical tower which is fixed onto the movable slide in a vertical position, also with the possibility of moving with respect to the slide in a vertical direction, so as to vary the distance from the ground beneath; lastly, a tool-holder head which is fixed to the lower end of the movable vertical tower, usually with the possibility of rotating around a vertical axis and/or around a horizontal axis, so as to reach any point of the article held on the basement beneath the main supporting crossmember.

Unfortunately, "gantry" type numeric control milling machines cannot perform mechanical processing with removal of material, which requires precision exceeding one hundredth of a millimeter, unless they have a main supporting crossmember with a largely over-sixed structure with respect to traditional uses, with the considerable increase in costs this involves.

On this type of numeric control machine, in fact, the slide and the vertical tower are fixed protrudingly onto the side of the main supporting crossmember, so the weight force associated with these two components produces, on the vertical plane, a mechanical moment which tends to tip over the movable vertical tower, tearing the slide from the side of the main supporting crossmember. This mechanical moment obviously discharges onto the body of the main supporting crossmember simultaneously with the normal mechanical bending stress due to the weight of the two components, and tends to twist the body of the crossmember in a variable manner as a function of the momentary position of the slide along the main supporting crossmember and the weight of the tool-holder head fixed onto the lower end of the vertical tower.

On the "gantry" type milling machines currently on sale, torsional and bending deformations of the main supporting crossmember are maintained within reasonable limits by means of appropriate over-sizing of the structure of said main supporting crossmember. This solution obviously heavily influences the total production costs of the machine.

Unfortunately, however, when the length of the horizontal main supporting crossmember exceeds 4-6 meters and the total weight of the slide and the vertical tower exceeds 2000 Kg, limitation of torsional deformations of the main supporting crossmember becomes technically and economically prohibitive, so the torsional and bending deformations of the crossmember start to negatively influence the degree of precision of positioning of the tool fixed onto the tool-holder head. This is why large "gantry" type milling and boring machines cannot guarantee, at reasonable costs, the same degree of precision offered by milling or boring machines of smaller dimensions.

DISCLOSURE OF INVENTION

The object of the present invention is therefore eliminating, or at least drastically reducing, the problems of excessive deformation of the horizontal main supporting crossmember typical of large "gantry" type milling or boring machines, but without increasing the production costs of this type of numeric control machine.

In accordance with these objectives, according to the present invention, a numeric control machine-tool is realised as defined in Claim 1, and preferably, but not necessarily, in any one of its dependent Claims.

BRIEF DESCRIPTION OF THE DRAWINGS

The present invention will now be described with reference to the appended drawings, which illustrate a non-limiting embodiment thereof, wherein:

FIG. 2 is a side view of the numeric control milling machine of FIG. 1, with parts in cross-section and parts removed for clarity; while FIG. 3 shows in enlarged scale, and with parts in cross-section and parts removed for clarity, a detail of the milling machine of FIG. 2; while

BEST MODE FOR CARRYING OUT THE INVENTION

Figure 1:
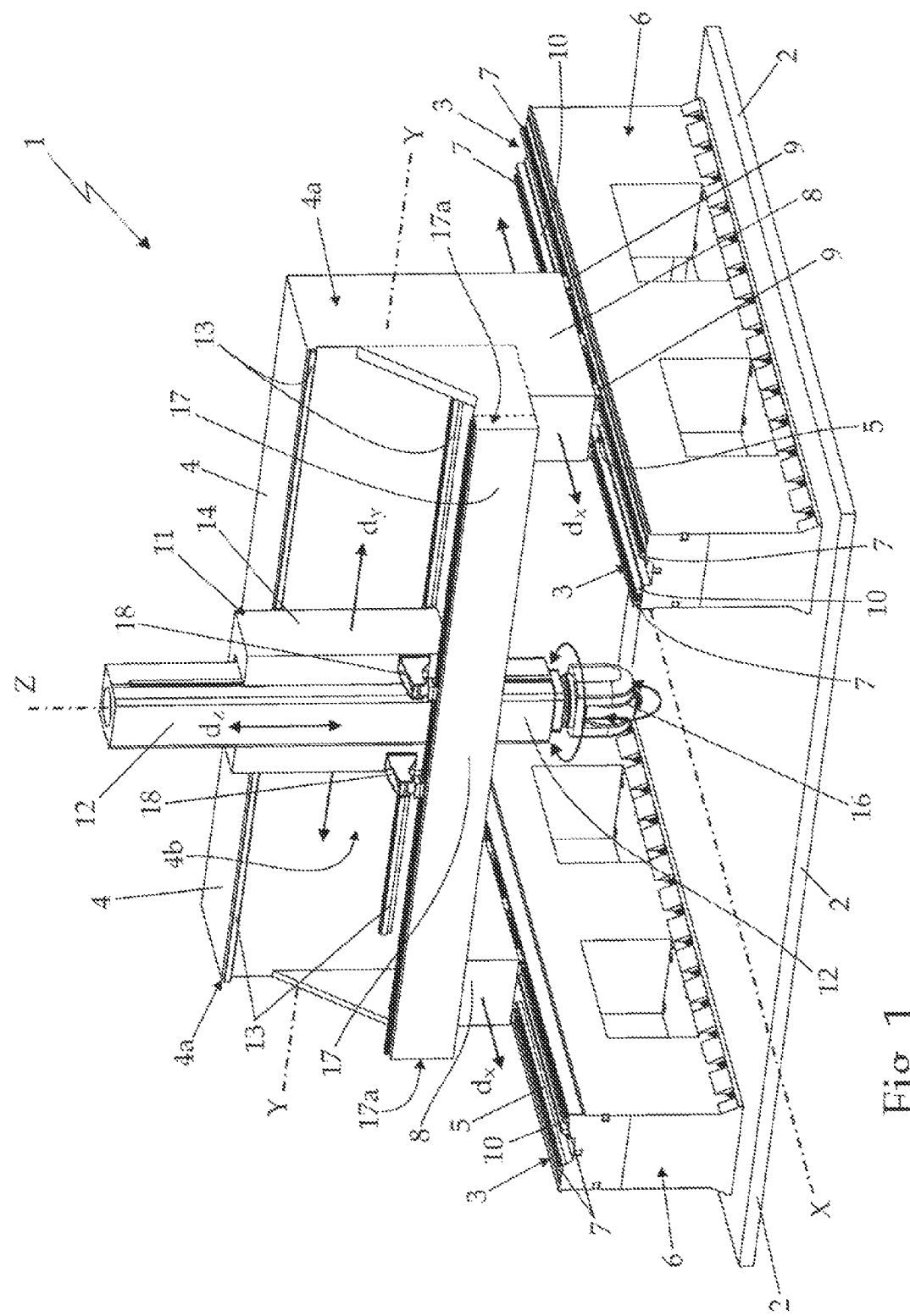
FIG. 1 is a three-dimensional view of a numeric control milling machine according to the present invention, with parts removed for clarity.
Figure 2:
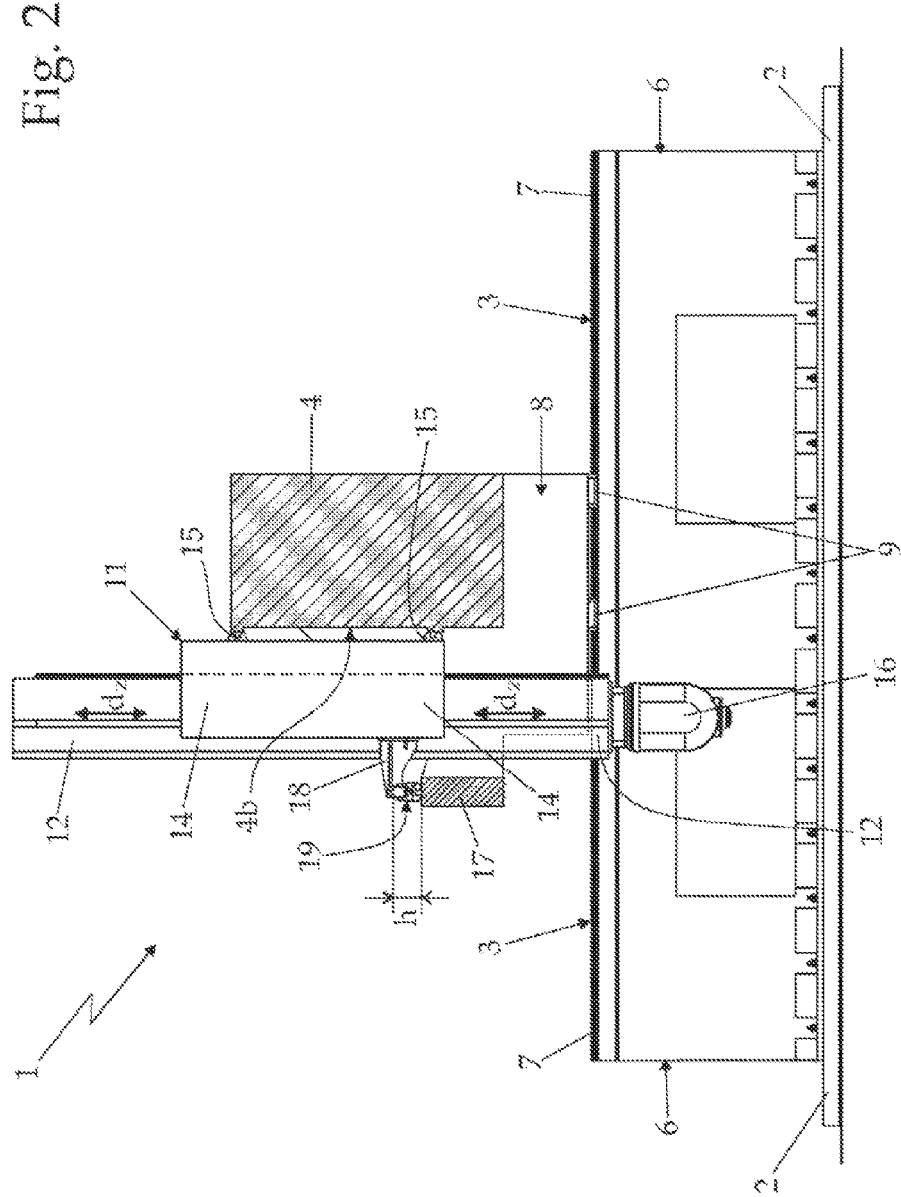

With reference to FIGS. 1 and 2, the number 1 denotes in its entirety a movable supporting crossmember type numeric control machine-tool, in this case a "gantry" type milling machine or boring machine, which is particularly advantageously used in milling or boring large metal articles.

The "gantry" type numeric control machine tool 1 essentially comprises: a basement 2 resting on the ground, which is equipped with two longitudinal rectilinear guides 3 which are parallel and alongside each other, which extend on the upper face of the basement 2 at a predetermined distance from each other, remaining simultaneously parallel to a first reference axis X, substantially horizontal; a rectilinear main supporting crossmember 4 with highly rigid structure and length preferably exceeding 4 meters, which extends above the basement 2, at a predetermined height from the ground, remaining locally parallel to a second reference axis Y, substantially horizontal and locally perpendicular to the X axis, and has two axial ends 4a structured so as to rest stably and in an axially sliding manner each on a respective longitudinal rectilinear guide 3 of the basement 2, so that the entire main supporting crossmember 4 can move on the basement 2 remaining always parallel to itself; and a first movement device 5, preferably electrically or hydraulically controlled, which is structured so as to move in a synchronised manner the two axial ends 4a of the main supporting crossmember 4 on the corresponding rectilinear guides 3 of the basement 2, so as to move on command the entire main supporting crossmember 4 on the basement 2 in a direction $d_x$ parallel to axis X.

In the example shown, the basement 2 is preferably, but not necessarily, equipped with two raised side walls or buttresses 6 which extend parallel to said reference axis X, on opposite sides of the vertical central plane of the machine, and the two longitudinal rectilinear guides 3 are each positioned on the top of a respective side wall or buttress 6 of the basement 2.

Each longitudinal rectilinear guide 3 is preferably, but not necessarily, formed of a series of rectilinear rails 7 which are parallel and adjacent to each other and which extend without interruptions on the basement 2, or, better, on the top of the raised side wall or buttress 6, parallel to axis X.

In the example shown, in particular, each longitudinal rectilinear guide 3 comprises two rectilinear rails 7 which are parallel and adjacent to each other and which extend without interruptions on the raised side wall or buttress 6 of the basement 2, preferably over the whole length of said raised side wall or buttress 6.

With reference to FIGS. 1 and 2, each of the two axial ends 4a of the main supporting crossmember 4 is, on the other hand, integral with or otherwise fixed rigidly to an intermediate movable carriage 8, which is fitted onto/rests in an axially sliding manner, directly on the longitudinal rectilinear guide 3 immediately beneath the axial end 4a of the crossmember, and the movement device 5 is structured so as to move, on command, the intermediate movable carriage 8 along the longitudinal rectilinear guide 3.

In the example shown, in particular, the intermediate movable carriage 8 is preferably positioned spanning all the rectilinear rails 7 which form the longitudinal rectilinear guide 3, and rests on each of the rectilinear rails 7 preferably by means of a congruous number of rolling sliding blocks 9.

Preferably, but not necessarily, the movement device 5 comprises, on the other hand, a rectilinear rack 10 which extends on top of the raised buttress 6 of the basement 2, parallel to axis X and substantially adjacent to the rectilinear rails 7 which form the longitudinal rectilinear guide 3, so as to pass skimming the intermediate movable carriage 8; a driving gear (not shown) which is fixed in an axially rotating manner on the intermediate movable carriage 8, so as to stably engage on the rectilinear rack 10; and an electric or hydraulic motor (not shown) which is positioned on the edge of the intermediate movable carriage 8, and is mechanically connected to the driving gear so as to drag said driving gear in rotation and consequently cause forced translation of the intermediate movable carriage 8 on the rectilinear guide 3.

With reference to FIGS. 1 and 2, the "gantry" type numeric control machine tool 1 also comprises: a movable slide 11 which is fixed protrudingly on a side 4b of the main supporting crossmember 4 with the possibility of moving along the body of the main supporting crossmember 4 in a direction $d_y$ substantially parallel to the longitudinal axis of the crossmember, or parallel to axis Y; and a substantially rectilinear, movable vertical tower 12 which extends coaxially to a third reference axis Z substantially orthogonal to the lying plane of axes X and Y, and is fixed on the movable slide 11 in a substantially vertical position, with the possibility of translating with respect to the movable slide 11 in a direction $d_z$ which is substantially vertical, or parallel to axis Z and orthogonal to the lying plane of axes X and Y.

The "gantry" type numeric control machine tool 1 is also provided with a second movement device (not shown), preferably electrically or hydraulically controlled, which is structured so as to move the movable slide 11 along the body of the main supporting crossmember 4, so as to vary on command the position of the movable slide 11 on the main supporting crossmember 4; and a third movement device (not shown), preferably electrically or hydraulically controlled, which is structured so as to move the movable tower 12 with respect to the movable slide 11, so as to vary on command the distance of the movable tower 12 from the basement 2 beneath.

In the example shown, in particular, the main supporting crossmember 4 is preferably provided with a series of rectilinear guides 13 which extend on the side 4b of the main supporting crossmember 4 parallel to the longitudinal axis of said crossmember, i.e. parallel to axis Y, without interruptions.

Preferably, the movable slide 11 comprises a rigid supporting casing 14 which is equipped with a rectilinear through-channel positioned parallel to axis Z, and is fixed/attached in a sliding manner on the said 4b of the main supporting crossmember 4, preferably by means of a series of hooking sliding blocks 15, each of which is fitted onto/coupled in an axially sliding manner on a rectilinear guide 13 substantially without mechanical clearance, so as to allow the supporting casing 14 of the movable slide 11 to run freely along the main supporting crossmember 4 substantially for the entire length of said crossmember.

The movable, tower 12 has, on the other hand, a substantially prism shape, and is preferably built into/inserted in an axially sliding manner in the rectilinear through-channel of the supporting casing 14 of the movable slide 11, so that the two end portions of the movable tower 12 protrude beyond the supporting casing 14, on opposite sides of said slide.

With reference to FIGS. 1 and 2, the machine tool 1 also comprises a tool-holder head 16 which is fixed in a rigid and stable manner, but easily removable, on the lower end of the movable tower 12, preferably with the possibility of rotating around a first reference axis preferably, but not necessarily, locally coinciding with the longitudinal axis of the movable, tower 12, or locally coinciding with axis Z and/or rotating around a second reference axis preferably, but not necessarily, locally orthogonal to the longitudinal axis of the movable tower 12.

Preferably, the machine tool 1 is also provided with a control unit (not shown) designed to control the various movement devices present on the machine tool 1, so as to move in a completely automatic manner the tool which is temporarily mounted on the tool-holder head 13.

The main supporting crossmember 4 is structured so as to support stably its own weight and the weight of the movable slide 11, the movable tower 12 and the tool-holder head 16, with the relative movement devices, if present.

In other words, the main supporting crossmember 4 acts as the sole static reference for correct spatial positioning of the tool mounted on the tool-holder head 16.

Figure 3:
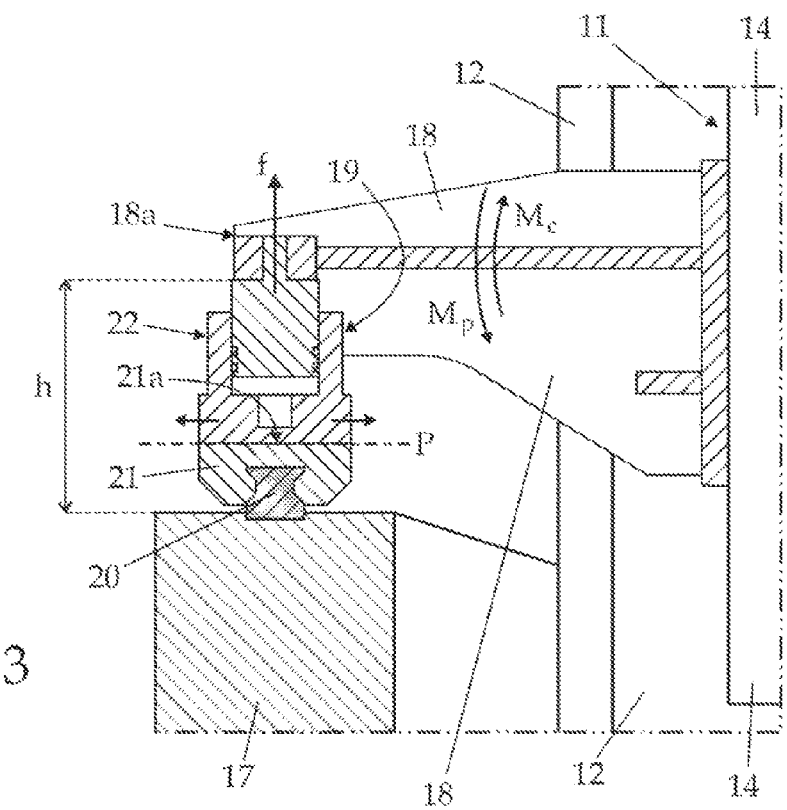

With reference to FIGS. 1, 2 and 3, unlike currently known "gantry" type milling or boring machines, the machine tool 1 also comprises a substantially rectilinear, auxiliary supporting crossmember 17, which extends beside the main supporting crossmember 4 substantially for the entire length thereof, so as directly and locally to face and be opportunely spaced from the side 4b of the crossmember which directly supports the movable slide 11. Preferably, the auxiliary supporting crossmember 17 is also substantially parallel to the main supporting crossmember 4, i.e. substantially parallel to axis Y.

Each of the two axial ends 17a of the auxiliary supporting crossmember 17 is also rigidly fixed/connected to the immediately adjacent axial end 4a of the main supporting crossmember 4, or better to the intermediate movable carriage 8 integral to the axial end 4a of the main supporting crossmember 4, so that the auxiliary supporting crossmember 17 is forced to move horizontally on the longitudinal rectilinear guides 3 of the basement 2 together with the main supporting crossmember 4.

In addition, the supporting casing 14 of the movable slide 11 is also equipped with at least one rigid projecting arm 18 which protrudes towards the auxiliary supporting crossmember 17 until it brings its distal end 18a above the auxiliary supporting crossmember 17, and has said distal end 18a resting on the auxiliary supporting crossmember 17 by means of interposition of a reaction member 19 which is structured so as to vary its height h, simultaneously exercising on the projecting arm 18 an upward thrust f, preferably solely with the vertically-oriented vectorial component.

The value of this upward thrust f is also such as to produce, on the main supporting crossmember 4, an additional mechanical moment $M_c$ which is substantially equal and opposite to the mechanical moment $M_p$, which the weight of the movable slide 11 and the movable tower 12 naturally generate on the main supporting crossmember 4 due to the distance or arm existing between the barycenters of the movable slide 11 and the movable tower 12, and the side 4b of the crossmember which supports the movable slide 11, or better the vertical to the rectilinear guides 13 which directly support the movable slide 11.

In greater detail, the value of this upward thrust f is preferably such as to produce, on the main supporting crossmember 4, an additional mechanical moment $M_c$ opposite to the mechanical moment $M_p$ and of a value equal to at least 70% of the mechanical moment $M_p$, which the weight of the movable slide 11 and the movable tower 12 naturally generate on the main supporting crossmember 4 due to the distance or arm existing between the barycenters of the movable slide 11 and the movable tower 12, and the side 4b of the main supporting crossmember 4.

In other words, the reaction member 19 is structured so as to transmit to the main supporting crossmember 4 a second mechanical moment $M_c$ which is capable of compensating more or less completely the mechanical moment $M_p$, due to protruding assembly of the movable slide 11 and the movable tower 12, so as substantially to eliminate the mechanical stress which causes torsional deformation of the main supporting crossmember 4.

Preferably, the value of the upward thrust f generated by the reaction member 19 is also a function of the weight of the tool-holder head 16 which is momentarily fixed to the lower end of the movable tower 12.

With reference to FIG. 1, in the example shown, in particular, the supporting casing 14 of the movable slide 11 is provided with two twin projecting arms 18 which protrude towards the auxiliary supporting crossmember 17, preferably starting from opposite sides of the vertical movable tower 12 and remaining preferably parallel and alongside each other, until they bring the distal end 18a above the auxiliary supporting crossmember 17. Each projecting arm 18 also rests on the auxiliary supporting crossmember 17 by means of interposition of a respective reaction member 19 which is structured so as to vary its height, simultaneously exercising on the projecting arm 18 an upward thrust f of a predetermined value and with solely the vertically-oriented vectorial component.

The sum of the upward thrusts f generated by the two reaction members 19 is such as to produce, on the main supporting crossmember 4, an additional mechanical moment $M_c$ which is substantially equivalent and opposite to the mechanical moment $M_p$ which the weight of the movable slide 11 and the movable tower 12 naturally generate on the main supporting crossmember 4 due to the distance or arm existing between the barycenters of the movable slide 11 and the movable tower 12 and the vertical to the rectilinear guides 13 which support the movable slide 11.

In greater detail, the sum of the Upward thrusts f generated by the two reaction members 19 is preferably such as to produce, on the main supporting crossmember 4, an additional mechanical moment $M_c$ opposite to the mechanical moment $M_p$ and with a value equal to at least 70% of the mechanical moment $M_p$.

With particular reference to FIG. 3, in the example shown, the auxiliary supporting crossmember 17 is also preferably provided, on the upper face, with a rectilinear rail 20 which extends without interruptions for the entire length of the auxiliary supporting crossmember 17, preferably remaining locally and substantially parallel to the longitudinal axis of said auxiliary supporting crossmember 17.

On the other hand, each reaction member 19 preferably comprises: a sliding block 21 resting in an axially sliding manner on the auxiliary supporting crossmember 17, or better fitted in an axially sliding manner onto the rectilinear rail; a hydraulic jack 22 arranged in a vertical position, between the sliding block 21 and the distal end 18a of the projecting arm 18, so as to thrust upwards the distal end 18a of the projecting arm 18; and a hydraulic circuit (not shown) designed to maintain the oil pressure inside the hydraulic jack 22 at a constant and adjustable value.

The hydraulic jack 22 is also mechanically connected to the sliding block 21 and to the projecting arm 18 so as to transmit to the distal end 18a of the projecting arm 18 exclusively the vertically-oriented vectorial component of the thrust produced by said hydraulic jack 22.

In greater detail, in the example shown, the hydraulic jack 22 is preferably interposed between the sliding block 21 and the distal end 18a of the projecting arm 18, with the possibility of moving/shifting freely with respect to at least one of the two elements, remaining on a horizontal reference plane P (i.e. moving/shifting freely in any horizontal direction), so as to transmit to the projecting arm 18 of the slide 11 solely the vertically-oriented vectorial component of the thrust produced by the hydraulic jack 22 which is directed orthogonally to the reference place P, i.e. the vertically-oriented vectorial component of the thrust produced by the hydraulic jack 22.

With reference to FIG. 3, in the example shown, in particular, the hydraulic jack 22 has the upper part fixed rigidly to the distal end 18a of the projecting arm 18, and has the lower part profiled so as to rest in a freely sliding manner, i.e. without any other mechanical restriction, on one flat and smooth portion 21a of the movable sliding block 21 which extends horizontally, so as to slide freely on said flat and smooth portion 21a in any direction. In this manner, the hydraulic jack 22 is able to discharge onto the auxiliary supporting crossmember 17, and therefore to transmit to the projecting arm 18, solely the vertically-oriented vectorial component of the thrust produced by the hydraulic jack 22.

Obviously, the hydraulic jack 22 could be replaced by a pneumatic jack, consequently the hydraulic circuit of the reaction member 19 would be replaced by a pneumatic circuit designed to maintain the air pressure present insider the pneumatic jack at a constant and adjustable value. General functioning of the machine tool 1 described above is identical to any other "gantry" type numeric control milling or boring machines and requires no further explanations.

In addition to what is described above, it is nonetheless opportune to specify that, since it is no longer subject to the mechanical torsional stress due to protruding assembly of the movable slide 11 and the movable tower 12, the main supporting crossmember 4 is subject to structural deformations of a considerably lower value than those encountered on the current large "gantry" type numeric control milling or boring machines, and therefore guarantees a higher degree of precision in positioning the tool.

The main supporting crossmember 4, in fact, is the only static reference for correct spatial positioning of the tool mounted on the tool-holder head 16.

The auxiliary supporting crossmember 17 also absorbs the mechanical stress produced by protruding assembly of the movable slide 11 and the movable tower 12, without interacting directly with the main supporting crossmember 4, so it may be subject to considerable mechanical deformations without this prejudicing in any way the degree of precision in spatial positioning of the tool mounted on the tool-holder head 16.

Bending deformations of the auxiliary supporting crossmember 17 are, in fact, compensated in real time by a change in the height of the reaction members 19.

Many advantages derive from introduction of the auxiliary supporting crossmember 17 and the reaction member 19. In the first place, the presence of a balancing mechanism of the mechanical moment $M_p$ due to protruding assembly of the movable slide 11 and the movable tower 12 allows "gantry" type numeric control milling or boring machines to be constructed which are able to perform mechanical processing with removal of material which requires precision considerably higher than one hundredth of a millimeter, without significantly increasing the production costs of the machine tool.

The possibility of discharging onto the auxiliary supporting crossmember 17 the mechanical moment $M_p$ due to protruding assembly of the movable slide 11 and the movable tower 12 also simplifies and lightens, with the same machine dimensions and/or precision, the structure of the main supporting crossmember 4, with a considerable saving of material and a significant reduction of the masses to be moved.

In conclusion, it is clear that changes and variants may be made to the numeric control machine tool 1 described above without deviating from the area of the present invention.

Figure 4:
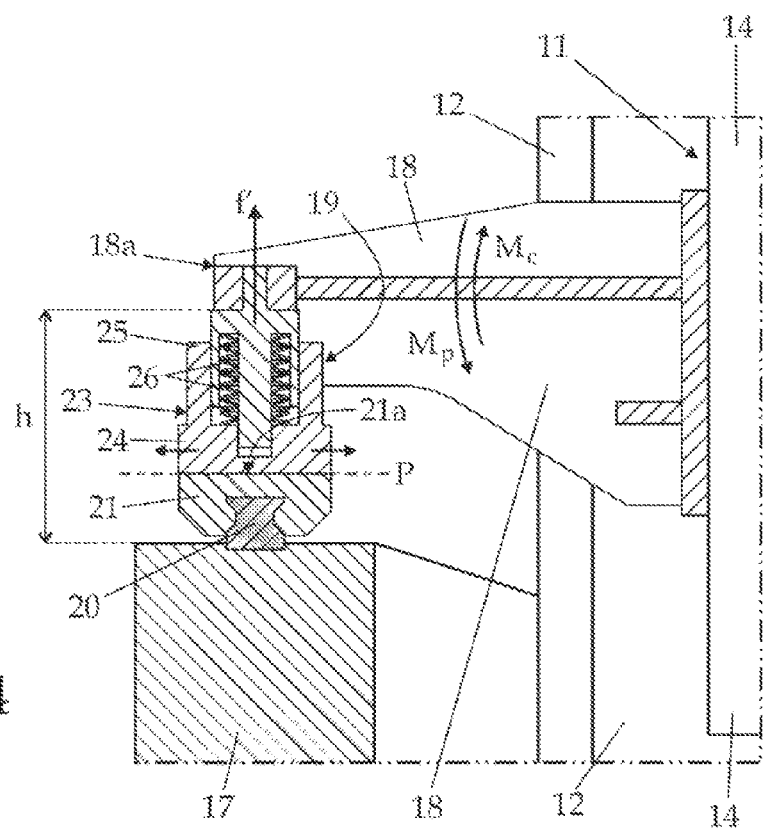
FIG. 4 shows in enlarged scale, and with parts in cross-section and parts removed for clarity, a different embodiment of the detail of the numeric control milling machine of FIG. 3.

For example, with reference to FIG. 4, in a less sophisticated embodiment, the hydraulic jack 22 may be replaced with a compression-preloaded elastic assembly 23, which is interposed between the sliding block 21 and the distal end 18a of the projecting arm 18, so as to be compressed with forces slightly higher than the preload value.

In other words, the elastic assembly 23 is sized so as to allow axial excursions without relevant changes in the reaction force with respect to the preload value.

In the example shown, in particular, the elastic assembly 23 comprises two cup-shaped bodies 24 e 25 which are rested one on the sliding block 21 and the other at the distal end 18a of the projecting arm 18, and are telescopically engaged one into the other so as to form a container of variable height; and a series of compression-preloaded cup-shaped springs 26, which are piled one on top of the other and are trapped inside the variable-height container so as to contrast the reciprocal approach of the two cup-shaped bodies 24 and 25.

Similarly to the hydraulic jack 22, the elastic assembly 23 is also mechanically coupled to the sliding block 21 and to the projecting arm 18 so as to transmit to the projecting arm 18 exclusively the vertically-oriented vectorial component of the elastic reaction force produced by said elastic assembly 23.

In greater detail, the cup-shaped body 24 has the bottom shaped so as to rest in a freely sliding manner, i.e. without any other mechanical restriction, on the flat and smooth portion 21a of the movable sliding block 21, so as to slide freely on said flat and smooth portion 21a in any direction. In this manner, the elastic assembly 23 is able to discharge onto the auxiliary supporting crossmember 17, and therefore transmit to the projecting arm 18, solely the vertically-oriented vectorial component of the elastic force f' which counteracts compression of the elastic assembly 23.

Furthermore, according to a different embodiment not shown, the projecting arm or arms 18 cross the auxiliary supporting crossmember 17 so as to position its/their distal end 18a beneath the auxiliary supporting crossmember 17. In this case as well, obviously, the distal end 18a of the projecting arm 18 is resting/hooked on the auxiliary supporting crossmember 17 by means of interposition of a reaction member 19 which is structured so as to vary its height h while simultaneously exercising an upward thrust f on the projecting arm 18, preferably with solely the vertically-oriented vectorial component.

The invention claimed is:

1. Numeric control machine tool (1) of the type comprising a basement (2) and a substantially rectilinear main supporting crossmember (4) which extends above the basement (2) remaining locally parallel to a first substantially horizontal reference axis (Y), and has the two ends (4a) structured so as stably to rest in an axially sliding manner each on a respective rectilinear longitudinal guide (3) which extends on the basement (2) parallel to a second reference axis (X) substantially horizontal and perpendicular to the first axis (Y); the machine tool (1) also comprising:

a movable slide (11) which is protrudingly fixed onto a side (4b) of the main supporting crossmember (4) with the possibility of moving along the body of the main supporting crossmember (4) in a direction ($d_y$) substantially parallel to said first axis (Y); and a substantially rectilinear, movable vertical tower (12) which extends coaxially to a third reference axis (Z) orthogonal to the lying plane of said first axis (Y) and second axis (X), and is fixed on the movable slide (11) in a substantially vertical position, with the possibility of translating with respect to the movable slide (11) in a direction ($d_z$) substantially parallel to said third axis (Z);

the main supporting crossmember (4) being structured so as to stably support the weight of the movable slide (11) and the movable vertical tower (12); the numeric control machine tool (1) being characterised by also comprising a substantially rectilinear auxiliary supporting crossmember (17) which extends beside the main supporting crossmember (4) so as to locally face and be spaced from the side (4b) of the crossmember which supports the movable slide (11); and in that the movable slide (11) is provided with at least one projecting arm (18) which protrudes towards the auxiliary support crossmember (17) until it crosses the auxiliary supporting crossmember (17), and rests on the auxiliary supporting crossmember (17) with the interposition of a reaction member (19) which is structured so as to vary its height (h) exercising on the projecting arm (18) an upward thrust (f) having a value such as to produce, on the main supporting crossmember (4), an additional mechanical moment (Mc) which is substantially equivalent and opposite to the mechanical moment (Mp) which the weight of the movable slide (11) and of the movable vertical tower (12) naturally generate on the main supporting crossmember (4) due to the distance between the barycenters of the movable slide (11) and of the mobile tower (12) and the side (4b) of the crossmember which supports the movable slide (11).

2. Machine tool according to claim 1, characterised in that the two ends (17a) of the auxiliary crossmember (17) are rigidly fixed/connected to the adjacent ends (4a) of the main supporting crossmember (4), so that the auxiliary supporting crossmember (17) is forced to move horizontally on the longitudinal rectilinear guides (3) of the basement (2) together with the main supporting crossmember (4).

3. Machine tool according to claim 1, characterised in that the auxiliary supporting crossmember (17) is substantially parallel to the main supporting crossmember (4).

4. Machine tool according to claim 1, characterised in that the reaction member (19) is structured so as to exercise on the projecting arm (18) an upward thrust (f) solely provided with vertically-oriented vectorial component.

5. Machine tool according to claim 1, characterised in that the reaction member (19) comprises a sliding block (21) resting in an axially sliding manner on the auxiliary supporting crossmember (17), and a jack (22) arranged in a vertical position between the sliding block (21) and the projecting arm (18), so as to push the projecting arm (18) upwards.

6. Machine tool according to claim 5, characterised in that the jack (22) is connected to the sliding block (21) and to the projecting arm (18) so as to transmit to the projecting arm (18) exclusively the vertically-oriented vectorial component of the thrust produced by said jack (22).

7. Machine tool according to claim 5, characterised in that the reaction member (19) also comprises a hydraulic or pneumatic circuit adapted to maintain the pressure of air or oil in the jack (22) at a constant and adjustable value.

8. Machine tool according to claim 5, characterised in that the auxiliary supporting crossmember (17) is provided on top with a rectilinear rail (20) which extends without interruptions substantially over the whole length of the auxiliary supporting crossmember (17), and in that the sliding block (21) is fitted in an axially sliding manner on said rectilinear rail (20).

9. Machine tool according to claim 1, characterised in that the reaction member (19) comprises a sliding block (21) resting in an axially sliding manner on the auxiliary supporting crossmember (17), and a compression-preloaded elastic assembly (23) which is interposed between the sliding block (21) and the projecting arm (18), so as to be compressed with forces that are slightly higher than the preload value.

10. Machine tool according to claim 9, characterised in that the elastic assembly (23) is connected to the sliding block (21) and to the projecting arm (18) so as to transmit to the projecting arm (18) exclusively the vertically-oriented vectorial component of the elastic force (f) counteracting the compression of the elastic assembly (23).

11. Machine tool according to claim 10, characterised in that the auxiliary supporting crossmember (17) is provided on top with a rectilinear rail (20) which extends without interruptions substantially over the whole length of the auxiliary supporting crossmember (17), and in that the sliding block (21) is fitted in an axially sliding manner on said rectilinear rail (20).

12. Machine tool according to claim 1, characterised in that the movable slide (11) is provided with two twin projecting arms (18) which protrude towards the auxiliary supporting crossmember (17), from opposite sides of the movable vertical tower (12), and in that each projecting arm (18) rests on the auxiliary supporting crossmember (17) with the interposition of a respective reaction member (19) structured so as to vary its height while exercising at the same time, on the projecting arm (18), an upward thrust (f) solely provided with vertically-oriented vectorial component.

13. Machine tool according to claim 12, characterised in that the sum of the upward thrusts (f) generated by the two reaction members (19) is such as to produce, on the main supporting crossmember (4), an additional mechanical moment ($M_c$) which is substantially equivalent and opposite to the mechanical moment ($M_p$) which the weight of the movable slide (11) and of the movable vertical tower (12) naturally generate on the main supporting crossmember (4) due to the distance existing between the barycenters of the movable slide (11) and of the mobile tower (12) and the side (4b) of the crossmember which supports the movable slide (11).

14. Machine tool according to claim 1, characterised in that the basement (2) is provided with two raised side walls or buttresses (6) which extend parallelly to said second axis (X) and the two longitudinal rectilinear guides (3) are located each on the top of a respective side wall or buttress (6) of the basement (2).

15. Machine tool according to claim 1, characterised in that it also comprises a tool-holder head (16) fixed on the lower end of the movable vertical tower (12).

16. Machine tool according to claim 1, characterised in that the main supporting crossmember (4) is longer than 4 meters.

17. Machine tool according to claim 1, characterised in that said upward thrust (f) has a value such as to produce, on the main supporting crossmember (4), an additional mechanical moment ($M_c$) which is substantially equivalent to at least 70% of the mechanical moment ($M_p$) which the weight of the movable slide (11) and of the movable vertical tower (12) naturally generate on the main supporting crossmember (4) due to the distance existing between the barycenters of the movable slide (11) and of the mobile tower (12) and the side (4b) of the crossmember which supports the movable slide (11).

* * * * *